Patented Aug. 25, 1925.

1,550,928

UNITED STATES PATENT OFFICE.

EDWARD HALFORD STRANGE, OF HOLBORN, LONDON, ENGLAND.

PROCESS FOR THE MANUFACTURE OF ALCOHOLS AND ACETONE.

No Drawing.   Application filed April 4, 1925.   Serial No. 20,853.

*To all whom it may concern:*

Be it known that I, EDWARD HALFORD STRANGE, a subject of the King of the United Kingdom of Great Britain and Ireland, residing at 7 Staple Inn, Holborn, London, W. C., England, have invented certain new and useful Improvements in Processes for the Manufacture of Alcohols and Acetone (for which I have filed an application in Great Britain on 9th January, 1925), of which the following is a specification.

This invention relates to improvements in connection with fermentation processes for the manufacture of alcohols and acetone.

Hitherto the manufacture of butyl alcohol and acetone has been carried out in a mash which is weak in fermentable content as compared with the mash normally employed in the manufacture of ethyl alcohol. For instance, it is quite usual to find that the mash employed in the former process contains only one third or one fourth of the amount of fermentable matter which the mash employed in the latter process contains.

It is obvious that, could the manufacture of butyl alcohol and acetone be carried out economically in a stronger mash than that now normally employed, important economies in utilization of plant might be effected, because a unit of fermentation plant could have an increased output in a unit of time.

I have now found that, if mash suitable for the production of ethyl alcohol by the action of yeast be provided and that if to such mash be added yeast and also bacteria of the type known to be capable of producing butyl alcohol and acetone, for example a bacillus of the type of the butylic bacillus of Fitz, the two fermentations, namely the ethyl alcohol fermentation and the butyl alcohol and acetone fermentation proceeds simultaneously and I have found that when the fermentations have ceased the fermented mash contains ethyl alcohol, butyl alcohol and acetone.

The fermentation process can be conducted at temperatures varying from about 15° C. to about 40° C. The lower temperatures favour the production of ethyl alcohol and the higher temperatures the production of butyl alcohol and acetone.

After the fermentation is complete the alcohols and acetone may be separated from the fermented mash by distillation.

The mash, suitable for the production of ethyl alcohol by the action of yeast, may be prepared in any suitable manner, for example, it may be prepared from any of the substances, hereinafter mentioned, or from mixtures of these substances, by known processes such as hydrolyzing by acids, or by means of malt or by the action of organisms such as amylomyces rouxii. The substances hereinbefore referred to are starch containing materials such as maize, dari, barley, rye, rice and other grains and also potatoes and cassava. Mashes composed wholly or partly of Jerusalem artichokes may be employed if the carbohydrates contained therein are previously subjected to a hydrolyzing process. Saccharose or cane sugar, molasses and glucose are valuable constituents of mashes employed in processes in accordance with this invention.

In carrying out the invention, I may add the two ferments to the mash at the same time or I may add either of them after the other. I prefer to operate in closed vessels but I can operate in open vessels or in vessels provided with loose covers. Substantial production of butyl alcohol and acetone and also of ethyl alcohol only takes place in approximate absence of air, but the great evolution of carbon dioxide by the yeast and of carbon dioxide and hydrogen by the bacteria renders approximate absence of air possible to attain in open or in partially closed vessels provided the vessels be not worked full or nearly full of mash.

This invention has an advantage in that it enables a mash made from or containing molasses to be employed since the yeast breaks the sugar down to a form which is suitable for both yeast and the butylic bacillus to act upon.

I claim:—

1. A process for the manufacture of alcohols and acetone in which both yeast and bacteria capable of producing butyl alcohol and acetone are added to a mash which is suitable for the production of ethyl alcohol by the action of yeast.

2. A process for the manufacture of alcohols and acetone in which yeast is first added to a fermentable mash and, after the fermentation is in operation, bacteria capable of producing butyl alcohol and acetone are then added.

3. A process for the manufacture of alcohols and acetone in which both yeast and bacteria capable of producing butyl alcohol and acetone are added to a fermentable mash made from molasses.

4. A process for the manufacture of alcohols and acetone in which yeast is first added to a fermentable mash made from molasses and, after the fermentation is in operation, bacteria capable of producing butyl alcohol and acetone are then added.

5. A process for the manufacture of alcohols and acetone in which both yeast and bacteria of the type of the butylic bacillus of Fitz are added to a fermentable mash which is suitable for the production of ethyl alcohol by the action of yeast.

6. A process for the manufacture of alcohols and acetone in which both yeast and bacteria of the type of the butylic bacillus of Fitz are added to a fermentable mash made from molasses.

7. A process for the manufacture of alcohols and acetone in which both yeast and bacteria capable of producing butyl alcohol and acetone are added to a fermentable mash made from molasses and other fermentable material.

8. A process for the manufacture of alcohols and acetone in which yeast is first added to a fermentabe mash made from molasses and other fermentable material and, after the fermentation is in operation, bacteria capable of producing butyl alcohol and acetone are then added.

9. A process for the manufacture of alcohols and acetone in which both yeast and bacteria of the type of the butylic bacillus of Fitz are added to a fermentable mash made from molasses and other fermentable material.

EDWARD HALFORD STRANGE.